United States Patent Office 3,338,822
Patented Aug. 29, 1967

3,338,822
PREFERENTIAL ADSORPTION OF NORMAL PARAFFINS ON MOLYBDENUM DISULPHIDE, TUNGSTEN DISULPHIDE AND BORON NITRIDE
Aleksander Jerzy Groszek, Ealing, London, England, assignor to The British Petroleum Company Limited, London, England, a corporation of England
No Drawing. Filed Feb. 2, 1966, Ser. No. 524,498
Claims priority, application Great Britain, Sept. 25, 1964, 39,140/64; Sept. 24, 1965, 40,700/65
8 Claims. (Cl. 208—310)

This application is a continuation-in-part of copending application Ser. No. 490,085, filed Sept. 24, 1965, now abandoned.

This invention relates to the separation of long-chain normal hydrocarbons from their mixtures with other hydrocarbons.

According to the present invention a method of separating long-chain normal hydrocarbons having at leas 10 carbon atoms per molecule from their mixtures with other hydrocarbons comprises contacting the mixture with a suitable layered solid material, as hereinafter defined, selectively to adsorb the normal hydrocarbons.

In this specification the expression "layered solid material" means a solid composed of crystals possessing a layered structure in which the constituent atoms form layers attached to each other by relatively weak London dispersion forces.

Preferably the separation is carried out in the presence of a solvent which is lower-boiling than the feedstock, particularly one of the common solvents for high-boiling hydrocarbons, for example benzene, n-heptane, iso-octane, or ethyl alcohol.

Suitable layered solid materials include, for example, molybdenum disulphide, tungsten disulphide, and boron nitride. "Oleophilic molybdenum disulphide" is particularly useful in the method of this invention. This material is described in detail below.

The mixture is preferably contacted with the adsorbent in the form of a dilute solution, preferably containing between 0.01% and 10% (weight per volume) of the normal hydrocarbons. Within this range the amount of n-hydrocarbons adsorbed increases with the concentration of the solution.

The amount of hydrocarbon adsorbed increases with the surface area of the adsorbent, and the surface area is preferably, therefore, as high as possible. The surface area of the adsorbent may be increased, for example, by grinding it. For use in the method of the present invention the surface area of the adsorbent is preferably within the range 20–900 m.²/gm., particularly 400–700 m.²/gm.

The amount of preferential adsorption also varies inversely with temperature, and preferably the adsorption is carried out at a temperature within the range $-50°$ C. to $+50°$ C.

The nature of the solvent has also been found to affect the amount of selective adsorption, which increases with the polarity of the solvent.

The chain length of hydrocarbons separable according to the method of the present invention will also depend to a certain extent on the solvent, the more polar the solvent the shorter will be the shortest chain lengh of hydrocarbon which can be adsorbed. For example using n-heptane, hydrocarbons of $C_{24}$ and above can be adsorbed whereas using ethyl alcohol, hydrocarbons as low as $C_{10}$ can be adsorbed.

The efficiency of adsorption has, moreover, been found to increase with increasing chain length.

Subsequent desorption of the selectivity adsorbed hydrocarbons may be effected by any of the customary methods, for example, by flushing with an excess of a solvent such as benzene, heating, or evacuating.

Practical applications of the preferential adsorption lie in:

(a) The reduction of cloud points and pour points of suitable petroleum products, including dewaxing, and (b) The isolation and concentration of compounds with long normal paraffinic chains from heavy petroleum distillates.

The invention is illustrated with reference to the following examples:

Example 1

Various layered solids were shaken with solutions of n–$C_{32}$ paraffin in n-heptane at 20° C. for 2 hours, then allowed to stand for 1 hour. The results are given in Table 1 below:

TABLE 1

| Adsorbent | Surface area of adsorbent m.²/g. (BET) | Solution strength before adsorption, percent w./v. | Solution strength after adsorption, percent w./v. | Amount of n-$C_{32}$ adsorbed | |
|---|---|---|---|---|---|
| | | | | Mg. n-$C_{32}$ per gram | Mg. n-$C_{32}$ per m.² |
| MoS₂ | 8.5 | 0.2 | 0.126 | 1.9 | 0.22 |
| MoS₂ | 8.5 | 0.2 | 0.156 | 1.6 | 0.19 |
| WS₂ | 2.0 | 0.2 | 0.114 | 1.2 | 0.6 |
| WS₂ | 2.0 | 0.2 | 0.156 | 1.5 | 0.75 |
| BN | 56.0 | 0.2 | 0.156 | 11.5 | 0.21 |
| BN | 56.0 | 0.5 | 0.23 | 15.0 | 0.27 |
| BN | 56.0 | 0.5 | 0.28 | 15.3 | 0.27 |
| BN | 56.0 | 1.0 | 0.54 | 24.0 | 0.43 |

Example 2

Experiments with the use of a flow-microcalorimeter indicated that the amount of n-hydrocarbon adsorbed increases with the polarity of solvent and decreases with temperature. Specifically, whereas n-hexadecane (0.05 mg.) gives no measurable heat effects when it comes into contact with BN in n-heptane, the contact in ethyl alcohol gives substantial heat effects, which are 0.6 mcal. and 1.3 mcal. respectively (this corresponds to the heat of adsorption of 12 cal./g. and 26 cal./g. respectively).

Heat of adsorption data also indicate that those mineral oil components that have high viscosity indices are more readily adsorbed on BN from n-heptane and ethyl alcohol solutions than the highly branched and cyclic compounds. It may be expected, therefore, that the other layered solids discussed above would retain preferentially the high VI components mixed with branched and cyclic compounds.

"Oleophilic molybdenum disulphide," preferred for use in this invention, is prepared by grinding molybdenum disulphide in an organic liquid.

It is thought that, during grinding in air, "polar" sites are formed on the surface of the molybdenum disulphide whereas, during grinding in an organic liquid, "nonpolar" or oleophilic sites are formed.

The molybdenum disulphide used in the preparation of the oleophilic material may be either natural or artificial. One example of such a product is that supplied by Acheson Colloids, "Dag 325."

Satisfactory products can be obtained by grinding in most organic liquids but it is desirable to use one the bulk of which can be easily removed from the oleophilic molybdenum disulphide. Those liquids distilling below 500° C. and having a viscosity below 600 centistokes at 100° F. are therefore preferred.

Examples of suitable organic liquids are the hydrocarbons such as n-heptane, iso-octane, toluene, hexadecane and hydrocarbon fractions obtained by the distillation of petroleum. Other organic liquids that may be used include most volatile oxygen-, halogen-, nitrogen- and sulphur-containing liquids, for example, isopropyl alcohol and carbon tetrachloride. It is preferred to use compounds which contain one or more methyl or methylene groups. Liquids that react with molybdenum disulphide under the conditions of treatment should not, of course, be used.

For best results during grinding, the amount of molybdenum disulphide in the disulphide/organic liquid mixture should not exceed 50% wt.; preferably it should be from 2 to 20% wt.

The grinding may be carried out in any suitable grinding mill or device and it is desirable to continue the grinding until an olephilic molybdenum disulphide having a surface area (as determined by nitrogen adsorption) of from 40 to 800, preferably from 50 to 200 square metres per gram is obtained. Usually this can be achieved by grinding at normal temperatures for the required period but the temperature of the mixture may be artificially increased if desired, for example, up to 250° C.

One of the quickest and most effective techniques is to carry out the grinding in a vibratory or "impact" ball mill.

It is desirable to exclude air so far as possible during the grinding operation and this can be most easily achieved by filling the mill with the organic liquid first, followed by the balls and disulphide. A suitable procedure is to fill the mill with the liquid, add half the balls, then the disulphide and finally the rest of the balls. Air dissolved in the organic liquid has no harmful effect.

When using a ball mill, it is of course desirable to use balls made of a material which does not react with the disulphide and which does not wear unduly during the grinding. Vibratory ball mills usually contain steel balls and these are suitable for the present purposes.

A suitable vibratory ball mill is sold under the trade name "Megapact." The grinding effect is produced by the impact of the balls upon the disulphide and each other.

Separation of the balls from the oleophilic molybdenum disulphide/liquid mixture after grinding is easily effected by sieving.

Separation of the bulk of the organic liquid from the oleophilic molybdenum disulphide may be carried out by any suitable means, for example, by evaporation of the liquid. Where a high boiling or viscous liquid is used, it may be necessary first of all to displace it by washing with a lighter liquid.

It will not usually be possible to separate the whole of the organic liquid from the oleophilic molybdenum disulphide but the presence of small amounts of the liquid in the oleophilic molybdenum disulphide is not usually a disadvantage and may even be an advantage in certain applications of the product. For most purposes a liquid content of not more than 10% wt. in the olepholic molybdenum disulphide is desirable after the separation process; the retained liquid will be mainly adsorbed liquid.

Illustrating the superiority of oleophilic molybdenum disulphide, two oleophilic molybdenum disulphide products were prepared from commercial molybdenum disulphides. The table below compares the properties of commercial, non-oleophilic molybdenum disulphides (comparisons 1 to 4) with the oleophilic variety (Examples A and B).

It is thought that the proportions of surface area of the disulphide with "polar" sites or with "non-polar" sites are measured by the heats of adsorption of n-butanol or n-dotriacontane and that the ratios of heats of adsorption gives some measure of the ratios of "polar" to "non-polar" sites.

| Reference No. | Type of MoS² | BET surface area meter²/gram | Heat of adsorption of n-butanol in millicalories/gram | Heat of adsorption of n-C³² in millicalories/gram |
|---|---|---|---|---|
| Example A | Acheson Colloids MoS₂ ground in n-heptane for 4 hours ("Megapact" mill). | 40 | 384 | 396 |
| Example B | Kodak MoS₂ ground in n-heptane for 4 hours ("Megapact"). | 39 | 380 | 470 |
| Comparison 1 | Acheson Colloids MoS₂ ground in air for 4 hours ("Megapact"). | 65 | 1,490 | 335 |
| Comparison 2 | Kodak MoS₂ (as obtained from maker) | 5 | | |
| Comparison 3 | Acheson Colloids "Dag 325" MoS₂ (as obtained from maker). | 8 | 42 | 9.6 |
| Comparison 4 | Acheson Colloids MoS₂ ground in air (by makers). | 22 | 281 | 110 |

The ratios of heats of adsorption of n-C³² and n-butanol are as follows:
Example A -------- 1.06    Comparison 2 --------- ---
Example B -------- 1.23    Comparison 3 --------- 0.23
Comparison 1 ----- 0.23    Comparison 4 --------- 0.39

The comparison samples 1 and 4 show some oleophilic properties, but they do, however, adsorb n-butanol strongly. Although the oleophilic molybdenum disulphides used in Examples A and B adsorb n-butanol they do so very much less strongly than do comparison samples 1 and 4.

The materials produced in Examples A and B can be used as thickeners of organic fluids, which form the base oils, to form dispersions or infusible greases. The greases show good mechanical stability. The oleophilic molybdenum disulphides can also be used as adsorbents for waxy components of petroleum distillates and their dewaxing activity is not significantly reduced by the presence of polar compounds in the distillates.

In the data reported in the table, the heats of adsorption of n-dotriacontane and n-butanol on the molybdenum disulphide were measured using the flow microcalorimeter as described in Chemistry and Industry, Mar. 20, 1965, 482–489.

The "Megapact" mill referred to above contains grinding chambers which are steel cylinders of 1½ inch interior diameter by 15 inches long and which are nearly filled with ¼ inch diameter steel balls. The mill is fitted with a one eighth horsepower electric motor and the oscillation can be adjusted from 1 to 4 mm. In operation, each cylinder was filled completely with the n-heptane and the steel balls and 25 to 30 grams of molybdenum disulphide were added. This left from 150 to 200 cc. n-heptane in each cylinder. The ends of the cylinders were then sealed by metal caps fitted with rubber washers and the grinding carried out. After grinding, the contents of the cylinders were placed in sieves which retained the balls and the n-heptane was removed from the oleophilic molybdenum disulphide by evaporation.

I claim:

1. A method of separating long-chain normal hydrocarbons having at least ten carbon atoms per molecule from their mixtures with other hydrocarbons comprising contacting the mixture with a layered solid adsorbent selected from the group consisting of molybdenum disulphide, tungsten disulphide and boron nitride.

2. A method as in claim 1 wherein the separation is carried out in the presence of a solvent having a lower boiling point than the mixture, selected from the group consisting of benzene, n-heptane, iso-octane and ethyl alcohol.

3. A method as in claim 2 wherein the amount of solvent employed is such as to form a dilute solution at the time of contact with the adsorbent, said dilute solution containing between about 0.01% to 10% (weight per volume) of the normal hydrocarbons.

4. A method as in claim 1 wherein the surface area of the adsorbent is within the range of from about 40 square meters per gram to 900 square meters per gram.

5. A method as in claim 1 wherein the adsorption is carried out at a temperature within the range of about $-50°$ C. to $+50°$ C.

6. A method as in claim 1 wherein the adsorbent is oleophilic molybdenum disulphide.

7. A method as in claim 6 wherein the oleophilic molybdenum disulphide is prepared by grinding molybdenum disulphide in an organic liquid having a boiling point below about 500° C. and a viscosity below about 600 centistokes at 100° F., the amount of liquid being such that the molybdenum disulphide is not present during grinding in excess of about 50% by weight, said liquid being substantially inert to molybdenum disulphide under the treatment conditions.

8. A method as in claim 7 wherein grinding is carried at least until a surface area of at least about 40 square meters per gram is achieved.

References Cited

UNITED STATES PATENTS

| | | | |
|---|---|---|---|
| 2,300,420 | 11/1942 | Hassler et al. | 208—26 |
| 2,586,889 | 2/1952 | Vesterdal et al. | 208—310 |
| 3,082,065 | 3/1963 | Wheeler | 23—134 |

DANIEL E. WYMAN, *Primary Examiner.*

P. E. KONOPKA, *Assistant Examiner.*

UNITED STATES PATENT OFFICE
CERTIFICATE OF CORRECTION

Patent No. 3,338,822                  August 29, 1967

Aleksander Jerzy Groszek

It is hereby certified that error appears in the above numbered patent requiring correction and that the said Letters Patent should read as corrected below.

Column 1, line 20, for "leas" read -- least --; line 67, for "400-700 m.$^2$/gm." read -- 40-700 m.$^2$/gm. --; column 2, line 7, for "lengh" read -- length --; line 14, for "selectivity" read -- selectively --; column 3, line 45, for "olephilic" read -- oleophilic --; column 4, line 9, for "olepholic" read -- oleophilic --; columns 3 and 4, in the table, in the heading to the second column, for "MoS$^2$" read -- MoS$_2$ --; same table, in the heading to the fifth column, line 3 thereof, and in the footnote, line 1 thereof, for "n-C$^{32}$", each occurrence, read -- n-C$_{32}$ --.

Signed and sealed this 15th day of October 1968.

(SEAL)
Attest:

EDWARD M. FLETCHER, JR.　　　　　　　　EDWARD J. BRENNER
Attesting Officer　　　　　　　　　　　Commissioner of Patents